March 28, 1944. H. S. CAMPBELL 2,344,966
AIRCRAFT EQUIPPED WITH SUSTAINING ROTORS
Filed March 16, 1940 2 Sheets-Sheet 1
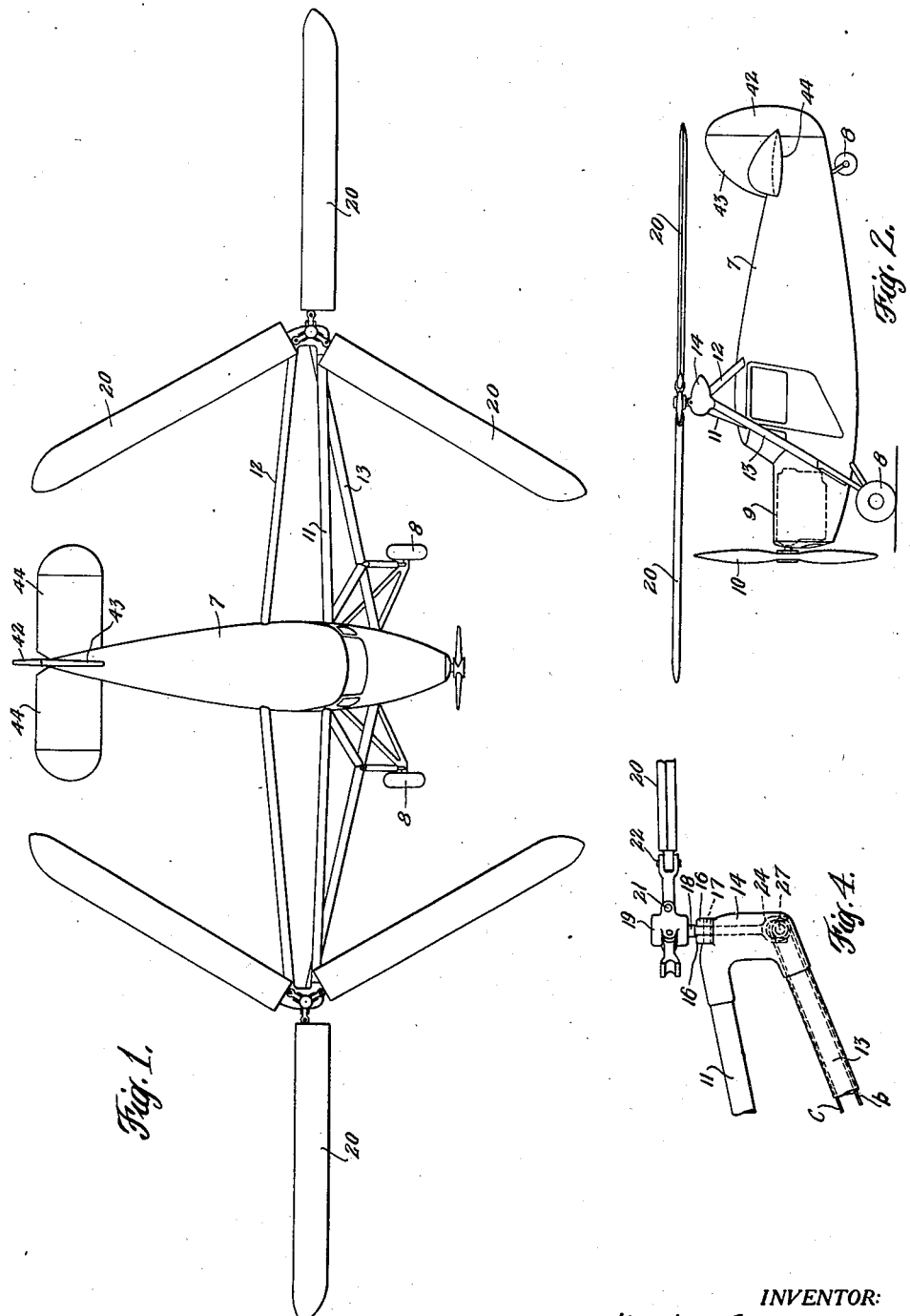
INVENTOR:
Harris S. Campbell
BY
Synnestvedt & Lechner
ATTORNEYS.

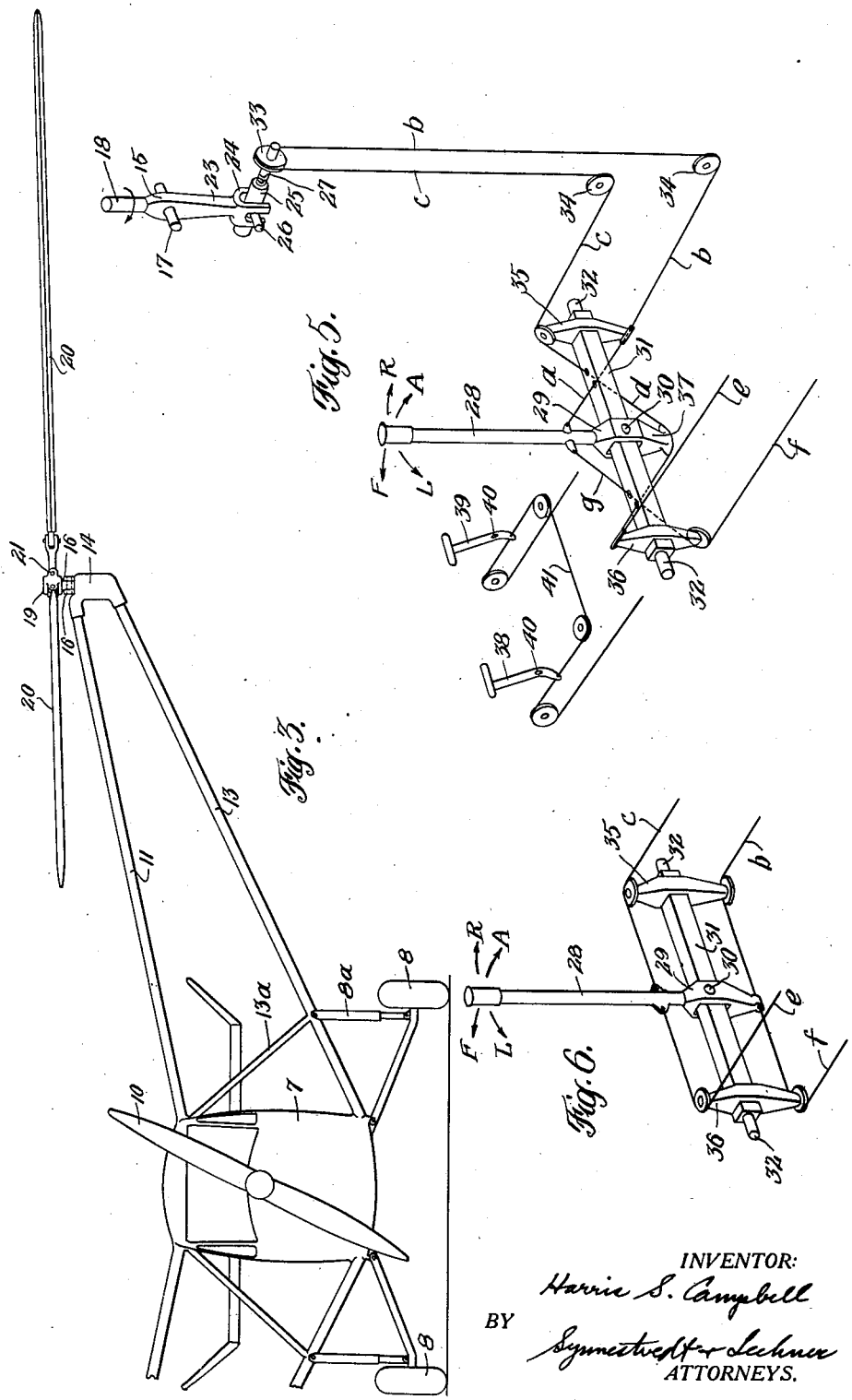

Patented Mar. 28, 1944

2,344,966

UNITED STATES PATENT OFFICE 2,344,966

AIRCRAFT EQUIPPED WITH SUSTAINING ROTORS

Harris S. Campbell, Bryn Athyn, Pa., assignor to Autogiro Company of America, Willow Grove, Pa., a corporation of Delaware Application March 16, 1940, Serial No. 324,247

7 Claims. (Cl. 244—17)

This invention relates to aircraft equipped with sustaining rotors, and is especially concerned with the twin rotor type of machine in which each rotor incorporates blades pivotally mounted for flapping movement and in which the two rotors of the pair are mounted in side-by-side relation.

Generally stated, the invention is especially useful for improvement of controllability of aircraft of the twin rotor type.

One of the principal objects of the invention is the provision of novel control means for such aircraft, especially a novel control system for use when making turns, said control system providing for differential tilting of the two rotors in longitudinal vertical planes.

Other objects of the invention relate to a novel form of control mechanism for effecting said differential tilt of the rotors, and also for effecting simultaneous or conjoint tilting of the rotors in the same sense.

Still further, the invention provides an improved form of rotor mount particularly suited to a twin rotor machine.

How the foregoing objects and advantages are achieved, will appear more fully from the following description referring to the accompanying drawings, in which—

Figure 1 is a top plan view of an aircraft constructed in accordance with the present invention;

Figure 2 is a side elevational view of the machine of Figure 1;

Figure 3 is a front view of the machine of Figures 1 and 2, the right-hand rotor (when viewed from the pilot's seat) and its supporting outrigger being broken away to facilitate illustration on an enlarged scale;

Figure 4 is a still further enlarged view of the mounting of the hub of one of the rotors;

Figure 5 is a diagrammatic layout of the control system of the machine of Figures 1 to 4; and Figure 6 is a fragmentary view similar to Figure 5 but illustrating a modified control system.

In connection with the following description, it is noted that at least most features of the invention are applicable to a variety of types of twin rotor machines. For instance, the invention is useful in a twin rotor machine in which the rotors are adapted to be autorotationally or aerodynamically rotated, at least during translational flight, the translational flight being induced by a separate motor driven propulsive airscrew. This is the general form of machine illustrated in Figures 1 to 5, inclusive, of the drawings.

As another example, certain features of the invention are applicable to a machine of the helicopter type incorporating a pair of side-by-side rotors adapted to be mechanically driven in flight, and further adapted to effect translational movement in whole or only in part under the influence of a horizontal component of the thrust of the rotors set up as a result of inclining the real or virtual axes thereof. The modification of Figure 6 illustrates an adaptation of a portion of the control system particularly suitable for this helicopter type of machine.

In view of the above, it will be plain that features of the invention are also applicable to various composite types of aircraft, for instance, an aircraft having rotors adapted for power driven operation and autorotational operation under different conditions.

In Figures 1, 2 and 3, the body or fuselage of the aircraft is indicated at 7, the same being provided with suitable landing gear incorporating wheels 8, or the equivalent. The forward propulsion engine is shown at 9 in Figure 2 and the propulsive airscrew driven thereby at 10. Each of the two side-by-side rotors is supported by an outrigger structure incorporating two upper struts 11 and 12 preferably connected with an upper fuselage longeron above the cabin door at points of connection of upright door frame members, and a lower strut 13 which is connected to the fuselage framing, for example, to a lower longeron. The strut 13 is located ahead of the cabin door and in the plane of the main shock strut 8a, as clearly shown in Figure 2, and is further connected with the fuselage close to the point of attachment of a landing gear strut, which is of advantage since at least a portion of the weight of the outriggers and rotors, when a landing is made, is transmitted substantially directly to the landing gear, instead of through fuselage elements. Similarly, the connection of shock absorber 8a of the landing gear with the strut 13 is of advantage from the standpoint of carrying landing loads directly to the landing gear. The interbrace 13a is likewise of importance in this respect since, as seen in Figure 3, this interbrace is connected at one end at the point of junction of the upper strut 11 and the upper fuselage longeron, and at the other end with the strut 13 adjacent the point of connection of the shock absorber 8a.

In addition to the effective interbracing secured in accordance with the foregoing, the arrangement of the outrigger elements and landing gear elements makes possible the use of a relatively wide tread landing gear, which is of importance in a machine of the twin rotor type.

While, if desired, tilting of the mean plane of each rotor (for purposes of control as above mentioned) may be effected by appropriate periodic differential change of blade pitch, I prefer the arrangement illustrated in the drawings and described below, wherein the physical axes or hubs of the rotors are tiltably mounted. However, insofar as the aerodynamics of control are concerned, either of these two modes of tilting the rotors may be employed.

The member 14 at the outer end of each outrigger serves to mount and enclose the lower portion of a hub support 15 (see Figures 4 and 5). This hub support is pivotally connected with a pair of apertured lugs 16—16 by means of a pivot pin 17 disposed with its axis extended transversely of the aircraft so as to provide for tilting movement of the associated rotor in a fore and aft direction. A hub spindle 18 projects upwardly above the pivot 17, and the hub member proper, illustrated at 19, is rotatively mounted on the spindle.

Each rotor incorporates a plurality of blades 20, three being illustrated in the drawings, each blade being connected with the hub 19 by pivot means including at least a "flapping" pivot 21 providing freedom for individual flapping movement of the blades in a direction generally transverse their mean rotative path of travel, in order to compensate for differential lift effects in translational flight. A "drag" or lag-and-lead pivot 22 is also desirably employed in the connection of each blade to the hub.

The lower extension 23 of the tiltable hub supporting member lies within the mounting casing 14 and is provided with a yoke 24 embracing the sleeve 25, the legs of the yoke being slotted to engage the pins 26 which project in opposite directions from the sleeve 25. Sleeve 25 is internally threaded to receive and cooperate with the threaded spindle 27 which is journalled in the supporting casing 14 and restrained as against axial movement. This mechanism provides for tilting of the hub support and the rotor carried thereby upon rotation of the spindle 27 which effects movement of the sleeve 25. Rotation of the spindle, in turn, is accomplished by the control system described just below with particular reference to Figure 5.

While a hand wheel or any other convenient type of manually operable control organ may be employed, the conventional type of control stick or column 28 is illustrated in Figure 5, this being desirable from the standpoint of simplicity. As there shown, the stick is pivotally mounted for lateral movement (movement transversely of the aircraft) by means of the yoke 29 and pivot 30, which latter is carried by transverse member 31 adapted to be journalled in fixed supporting structure by means of the trunnions 32—32 arranged at the ends thereof. The trunnions provide a pivot axis for movement of the control stick fore and aft.

In the showing of Figure 5 only one of the two tiltable hub supports is illustrated, i. e., the hub support for the right-hand rotor (the rotor toward the right hand of the pilot when seated in the machine). However, the connections to the two rotors are essentially the same and include a single closed circuit chain or cable system interconnecting both of the rotors and the control stick. In tracing out this cable system, it is first noted that the spindle 27 for the right-hand rotor support (shown in Figure 5) carries a sprocket or pulley 33 with which the chain or cable engages. A similar pulley is mounted on the threaded shaft 27 for the left-hand rotor (not shown).

Note further than any suitable arrangement of guide pulleys, such as shown at 34—34, may be employed intermediate the rotor mounts and the control stick, in order to guide the cable in the various runs thereof. Additional pulleys for the cable are mounted at the upper and lower ends of the double arms 35—36 which are fixed to the member 31.

The cable itself is associated with the above system, as follows:

Beginning at the right-hand side of the control stick, a cable length $a$ extends downwardly and outwardly over the pulley at the lower end of arm 35 and thence over a guide pulley 34 in a rub $b$ extended to the actuating pulley 33 of the tilting mechanism. From here the cable returns in a run $c$ over another guide pulley 34 and thence over a pulley at the upper end of arm 35, and inwardly and downwardly, as shown at $d$, for connection or engagement with an arm 37 depending from the yoke 29. From here the cable extends upwardly and outwardly to pass over a pulley at the upper end of arm 36 and thence in a run $e$ to the actuating pulley for the left-hand rotor, from which the cable returns in a run $f$ cooperating with the pulley at the lower end of arm 36. In the last run $g$ of the cable, the extension is upwardly and inwardly to the left-hand side of the control stick 28.

As shown in Figure 4, the control cables are preferably carried from the fuselage to the rotor hubs through tubular outrigger members such as the member 13.

With the foregoing mechanism and with threading of like sense (left-hand screw, in this instance) on the two threaded shafts 27 for the right and left rotors, tilting of the control stick in the fore and aft direction, as indicated by the arrows F and A, respectively, causes the two rotors to be tilted conjointly and correspondingly either forward or rearward. Tilt of the control stick in the direction L (to the left) causes the right-hand rotor to be tilted upwardly at the forward side and the left-hand rotor downwardly at the forward side. The converse differential rotor tilting is effected by movement of the control stick in the direction R.

The mechanism shown in Figure 5 further includes a pair of rudder pedals 38—39 which may be pivotally mounted on fixed structure, as at 40, and interconnected with a tension cable system 41 extended to actuate the rudder 42 disposed at the tail of the machine, as clearly seen in Figures 1 and 2, the provision of the rudder being preferable in the type of machine illustrated in Figures 1 to 5 inclusive, for reasons which will appear more fully hereinafter. The hook-up of the control cables for the rudder is preferably made in the conventional way.

If desired, the tail structure may also incorporate vertical and horizontal stabilizing surfaces such as indicated at 43 and 44, respectively.

As hereinbefore mentioned, the form of aircraft illustrated in Figures 1 to 5 inclusive incorporates a pair of rotors which are adapted to be aerodynamically or autorotationally actuated at least during normal translational flight as induced by the tractor airscrew 10. In this type of machine, and with pivotally mounted blades, a change in the angle of the mean rotor disc with reference to the path of flight varies the magnitude of the rotor lift, in consequence of which by slight differential angular tilting movements of the rotors in fore and aft planes, a rolling moment is introduced which is utilized in the control system above described for banking purposes.

Thus, when making a turn to the left, the left rudder pedal is actuated, and at the same time the control stick 28 is tilted to the left to an extent sufficient to give the desired banking by tilting the right rotor to a higher and the left rotor to a lower angle with respect to the flight wind. Right-hand turns are, of course, effected in a corresponding manner by employing the right rudder pedal and right tilt of the control stick.

While differential tilt of the rotors in the sense just described is primarily effective to set up a banking moment, it may also introduce a small moment tending to turn the machine about its vertical axis in a direction contrary to the intended direction of turning. This small moment may effectively be overcome by the employment of a rudder having reasonably large volume and a reasonably extended range of angular deflection.

To control the attitude of the aircraft in pitch, the control stick is moved either fore or aft, in consequence of which the cable control system effects simultaneous tilting of the two rotors either forwardly or rearwardly. This tilting is accompanied by a shift in the lift lines of the rotors with respect to the center of gravity of the aircraft, forward tilt causing the lift lines to swing rearwardly below the rotors and thereby introduce a moment tending to nose the machine downwardly. The converse applies to conjoint rearward tilt of the rotors.

As hereinbefore stated, the use of a control mechanism for differentially tilting a pair of rotors in fore and aft planes is adaptable to a helicopter type aircraft in which the rotors are mechanically driven during translational flight, such flight being induced in whole or in part by a horizontal component of the lifting reaction of the rotors. Power drive mechanism for a twin rotor machine is shown, for example, in copending application of J. A. J. Bennett, Serial No. 242,057, filed November 23, 1938, and issuing concurrently herewith.

Because of the different conditions encountered in this helicopter type operation, it is preferred to invert certain of the control connections, this inversion being illustrated by the modification appearing in Figure 6. Here the control connections are the same as those illustrated in Figure 5 with only one exception, i. e., that the runs of the cable associated with the control stick are disposed in a parallel pattern rather than in the crossed pattern of Figure 5. The effect of this is to cause upward tilting of the left rotor at the forward side and downward tilting of the right rotor at the forward side upon movement of the control stick 28 to the left, and vice versa. This, it will be noted, is differential rotor tilting in an inverted sense as compared with the arrangement of Figure 5.

In an aircraft of the helicopter type, because of the normal flow of air in a direction downwardly through the rotor disc (which is opposite to the general direction of airflow through a rotor of the aerodynamically driven type) the sense of differential rotor tilting of Figure 6 is primarily effective to set up a moment tending to turn the machine about a vertical axis. Conjoint tilting of the two rotors in the same sense is effective to control the attitude of the aircraft in pitch and may also be used to control the translational flight speed. The control system of Figure 6 may, of course, be combined with other controls.

While different senses of differential rotor tilting may be employed, depending upon the characteristics of the particular aircraft, it will be noted that in the two types discussed above, differential tilting is effected by lateral movement of the control element employed when making turns.

In connection with the appended claims, it is to be understood that (unless specific reference is made to tilting the rotor hub) where reference is made to tilting of the rotors, it is contemplated that such tilting may be effected either by periodic differential change of blade pitch or by tilting the physical axis or hub, both of which expedients result in tilting of the mean path of travel of the rotor blades.

I claim:

1. An aircraft having a pair of pivoted-blade sustaining rotors arranged in side-by-side relation in positions where the rotor lift lines may be shifted forwardly or rearwardly of the center of gravity location, and control mechanism for use in making a turn including a manually operable control member and means coupling said member to both rotors for differentially tilting the rotors in longitudinal vertical planes by a single movement of said control member.

2. An aircraft having a pair of pivoted-blade sustaining rotors arranged in side-by-side relation in positions where the rotor lift lines may be shifted forwardly or rearwardly of the center of gravity location, and control mechanism for use in making a turn including a manually operable control organ movable in a transverse plane, and control connections between the rotors and said organ providing for differentially tilting the rotors in longitudinal vertical planes upon movement of the control organ in said transverse plane.

3. An aircraft in accordance with claim 2, further characterized by the provision of sustaining rotors having freely-rotatable blades adapted to be aerodynamically rotated in translational flight and by control connections between the rotors and the control organ providing for tilting the left-hand rotor downwardly at the front and for tilting the right-hand rotor upwardly at the front upon movement of the control organ to the left, and for tilting the left-hand rotor upwardly at the front and the right-hand rotor downwardly at the front upon movement of the control organ to the right.

4. An aircraft in accordance with claim 2, further characterized by the provision of sustaining rotors having freely-rotatable blades adapted to be aerodynamically rotated in translational flight and by control connections between the rotors and the control organ providing for tilting the left-hand rotor downwardly at the front and for tilting the right-hand rotor upwardly at the front upon movement of the control organ to the left, and for tilting the left-hand rotor upwardly at the front and the right-hand rotor downwardly at the front upon movement of the control organ to the right, and said aircraft further being characterized by the provision of a controllable rudder operative independently of but in coordination with the rotor control.

5. An aircraft in accordance with claim 2, further characterized by the provision of sustaining rotors adapted to be mechanically driven in translational flight and by control connections between the rotors and the control organ providing for tilting the left-hand rotor upwardly at the front and for tilting the right-hand rotor downwardly at the front upon movement of the control organ to the left, and for tilting the left-hand rotor downwardly at the front and the right-hand rotor upwardly at the front upon movement of the control organ to the right.

6. An aircraft having a pair of pivoted-blade sustaining rotors arranged in side-by-side relation in positions where the rotor lift lines may be shifted forwardly or rearwardly of the center of gravity location, and control mechanism for use in making a turn including a manually operable control organ movable in transverse and longitudinal directions, and control connections between the rotors and said organ providing for differentially tilting the rotors in longitudinal vertical planes upon movement of the control organ in said transverse direction and for conjoint tilting of the rotors in the same sense in said longitudinal vertical planes upon movement of the control organ in the fore and aft direction.

7. An aircraft in accordance with claim 1 wherein the rotor tilting is accomplished by the provision of tiltably mounted rotor hubs, and wherein the means which couple the manually operable control member to the rotors comprise screw threaded connections for tilting said hubs.

HARRIS S. CAMPBELL.